(12) United States Patent
Stavi et al.

(10) Patent No.: US 10,491,649 B2
(45) Date of Patent: Nov. 26, 2019

(54) STATISTICAL MULTIPLEXING USING A PLURALITY OF ENCODERS OPERATING UPON DIFFERENT SETS OF UNIQUE AND SHARED DIGITAL CONTENT

(71) Applicant: Harmonic, Inc., San Jose, CA (US)

(72) Inventors: Yoed Stavi, Zikhron Ya'akov (IL); Arie Zeev Weizel, Petah Tikva (IL); Noa Spanier, Sde Itzhaq (IL)

(73) Assignee: Harmonic, Inc., San Jose, CA (US)

( * ) Notice: Subject to any disclaimer, the term of this patent is extended or adjusted under 35 U.S.C. 154(b) by 364 days.

(21) Appl. No.: 15/096,614

(22) Filed: Apr. 12, 2016

(65) Prior Publication Data

US 2017/0295216 A1   Oct. 12, 2017

(51) Int. Cl.
*H04L 29/06*   (2006.01)

(52) U.S. Cl.
CPC ........ *H04L 65/607* (2013.01); *H04L 65/4069* (2013.01)

(58) Field of Classification Search
CPC .......................... H04L 65/607; H04L 65/4069
USPC ......................................................... 709/219
See application file for complete search history.

(56) References Cited

U.S. PATENT DOCUMENTS

| | | | | |
|---|---|---|---|---|
| 6,097,757 A * | 8/2000 | Boice | .................. | H04N 19/172 375/240 |
| 7,266,132 B1 * | 9/2007 | Liu | .................. | H04N 21/23406 348/E5.008 |
| 2002/0037037 A1 * | 3/2002 | Van Der Schaar | .......................... | H04N 21/2662 375/240.1 |
| 2003/0006916 A1 * | 1/2003 | Takamizawa | ......... | G10L 19/173 341/61 |
| 2004/0148625 A1 * | 7/2004 | Eldering | ................ | H04N 7/165 725/34 |
| 2005/0281328 A1 * | 12/2005 | Hurst, Jr. | ......... | H04N 21/23424 375/240 |
| 2006/0018254 A1 * | 1/2006 | Sanders | ............. | H04N 21/2365 370/216 |
| 2008/0117965 A1 * | 5/2008 | Vysotsky | ............ | H04L 12/1813 375/240.01 |
| 2008/0232469 A1 * | 9/2008 | Nie | ...................... | H04N 19/159 375/240.12 |
| 2009/0052540 A1 * | 2/2009 | Gutman | ........... | H04N 21/23439 375/240.24 |
| 2009/0052552 A1 * | 2/2009 | Gutman | ............. | H04N 21/2356 375/240.26 |

(Continued)

*Primary Examiner* — David R Lazaro
*Assistant Examiner* — Berhanu Shitayewoldetadik
(74) *Attorney, Agent, or Firm* — Brokaw Patent Law PC; Christopher J. Brokaw (57) ABSTRACT

Approaches for allocating bit rates to multiple digital video streams. Bit rates may be allocated to digital video streams by permitting any unit of digital video carried by the digital video streams to be a member of a set of digital content that is constrained by a sum of bit rates assigned to members of the set. To do so, a first set of bit rates to assign to each of the digital video streams is determined. Thereafter, a second set of bit rates to assign to each shared unit of digital video, which appears in two or more of the digital video streams, is determined. This may involve identifying the lowest bit rate assigned to each shared unit of digital video across the two or more bit rate pools. A remaining bit rate allotment is allocated to non-shared units of digital video within the digital video streams.

15 Claims, 4 Drawing Sheets

(56) References Cited

U.S. PATENT DOCUMENTS

| | | | |
|---|---|---|---|
| 2011/0099599 A1* | 4/2011 | Rusch-Ihwe | H04H 20/06 |
| | | | 725/117 |
| 2013/0265385 A1* | 10/2013 | Wang | H04N 7/152 |
| | | | 348/14.09 |
| 2014/0013376 A1* | 1/2014 | Xu | H04N 21/25 |
| | | | 725/116 |
| 2015/0163484 A1* | 6/2015 | Li | H04N 19/115 |
| | | | 375/240.02 |
| 2015/0312599 A1* | 10/2015 | Brockmann | H04N 21/6125 |
| | | | 725/109 |
| 2016/0301935 A1* | 10/2016 | McCarthy | H04N 19/85 |
| 2016/0301957 A1* | 10/2016 | McCarthy | H04N 19/85 |

* cited by examiner

STATISTICAL MULTIPLEXING USING A PLURALITY OF ENCODERS OPERATING UPON DIFFERENT SETS OF UNIQUE AND SHARED DIGITAL CONTENT

FIELD OF THE INVENTION

Embodiments of the invention relate to performing statistical multiplexing using a plurality of encoders operating upon different sets of unique and shared digital content.

BACKGROUND

In statistical multiplexing, a communication channel is divided into an arbitrary number of variable bit-rate digital channels or data streams. The number of bits allocated to each of the digital channels is dynamically adjusted by an encoder many times a second based on the complexity of the digital video carried by each channel. The complexity of digital video is a measure of how much data (or 'bits') is required to describe how to display the digital video. When a particular channel requires an increase in bits to sufficiently describe the complexity of digital video carried thereby, additional bits can be allocated to that channel from another channel which is not using all of its assigned bits at that moment.

Harmonic, Inc. of San Jose, Calif. uses a propriety implementation of statistical multiplexing over an IP network named DiviTrack™ statistical multiplexing, which can be abbreviated as DToIP.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for allocating bit rates to programs appearing in multiple digital video streams are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention enhance the efficiency and flexibility of statistical multiplexing when two or more encoders in the system are operating upon the same program. The encoders and the multiplexer of an embodiment cooperate to treat programs that appear in multiple streams ("shared programs") differently than programs that appears in only one stream ("non-shared programs"). Advantageously, embodiments of the invention provide for encoding shared programs only once by a single encoder, regardless of how many times the shared program appears in channels or streams of a transport stream.

As a result, computational resources of the computers on which the encoding is performed are preserved due to the reduction in required encoding jobs compared to prior approaches. Additionally, embodiments of the invention reduce network traffic compared to prior approaches as reducing the amount of encoding jobs in the system results in fewer messages being exchanged between encoders and the multiplexer. Further, the computer hardware implementing embodiments of the invention consumes less electrical power than prior approaches due to the reduction in required encoding jobs.

Figure 1:
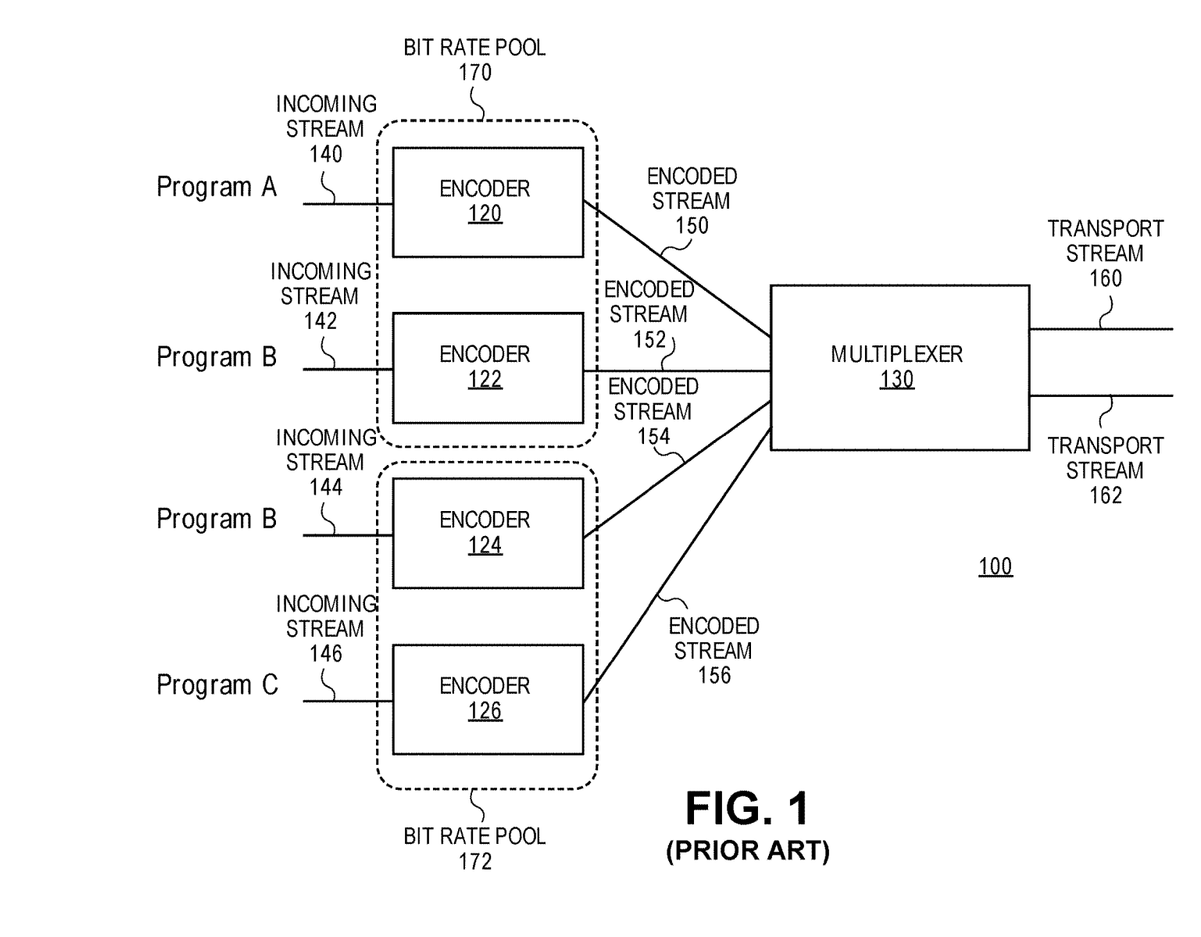
FIG. 1 is a block diagram of the functional components of a system according to the current state of the art.

Before describing how embodiments of the invention operate, it will be helpful to appreciate certain prior art approaches. FIG. 1 is a block diagram of the functional components of system 100 according to the current state of the art. System 100 includes encoders 120, 122, 124, and 126, multiplexer 130, and bit rate pools 170 and 172. Encoders 120, 122, 124, and 126 individually refer to hardware or software components responsible for converting an incoming digital video stream (expressed in a first digital video format) to an encoded digital video stream (expressed in a second and different digital video format).

For example, encoders 120, 122, 124, and 126 may respectively convert incoming digital video streams 140, 142, 144, and 146 from a first digital video format to encoded streams 150, 152, 154, and 156, each of which is expressed in digital video format different from which incoming streams 140, 142, 144, and 146 are expressed. It may be advantageous or necessary to change the format in which a digital video file is expressed for a variety of reasons, such as to achieve, gain, or promote standardization, speed, secrecy, security, and/or compression.

Each of incoming digital video streams 140, 142, 144, and 146 may comprise one or more units of digital video, e.g., a program. For purposes of providing a clear explanation, it shall be assumed in the description below that digital video streams 140, 142, 144, and 146 each carry a single program at a time.

Multiplexer 130 refers to a hardware or software component for combining multiple encoded streams, such as encoded streams 150, 152, 154, 156 into a single transport stream, such as transport stream 160 or transport stream 162.

A bit rate pool refers to a group of programs that are constrained by a sum of bit rates assigned to members of the group. For example, as depicted in FIG. 1, bit rate pool 170 refers to the programs carried by encoded streams 150 and 152, while bit rate pool 172 refers to the programs carried by encoded streams 154 and 156. In this way, multiplexer 130 encodes incoming streams 140 and 142 using a total amount of bit rates that does not exceed the bit rate pool 170.

For purposes of providing a concrete example, assume that transport stream 160 comprises programs carried by encoded streams 150 and 152 while transport stream 162 comprises programs carried by encoded streams 154 and 156.

Further assume that, as depicted in the example of FIG. 1, incoming stream 140 carries program A, incoming streams 142 and 144 carry program B, and incoming stream 146 carries program C. Consequently, transport stream 160 would carry encoded programs A and B while transport stream 162 would carry encoded programs B and C.

Note that in this example, program B is encoded twice, e.g., by encoders 122 and 124. Embodiments of the invention advantageously avoid such duplicative effort while still observing the bit constraints of all bit pools in the system.

Figure 2:
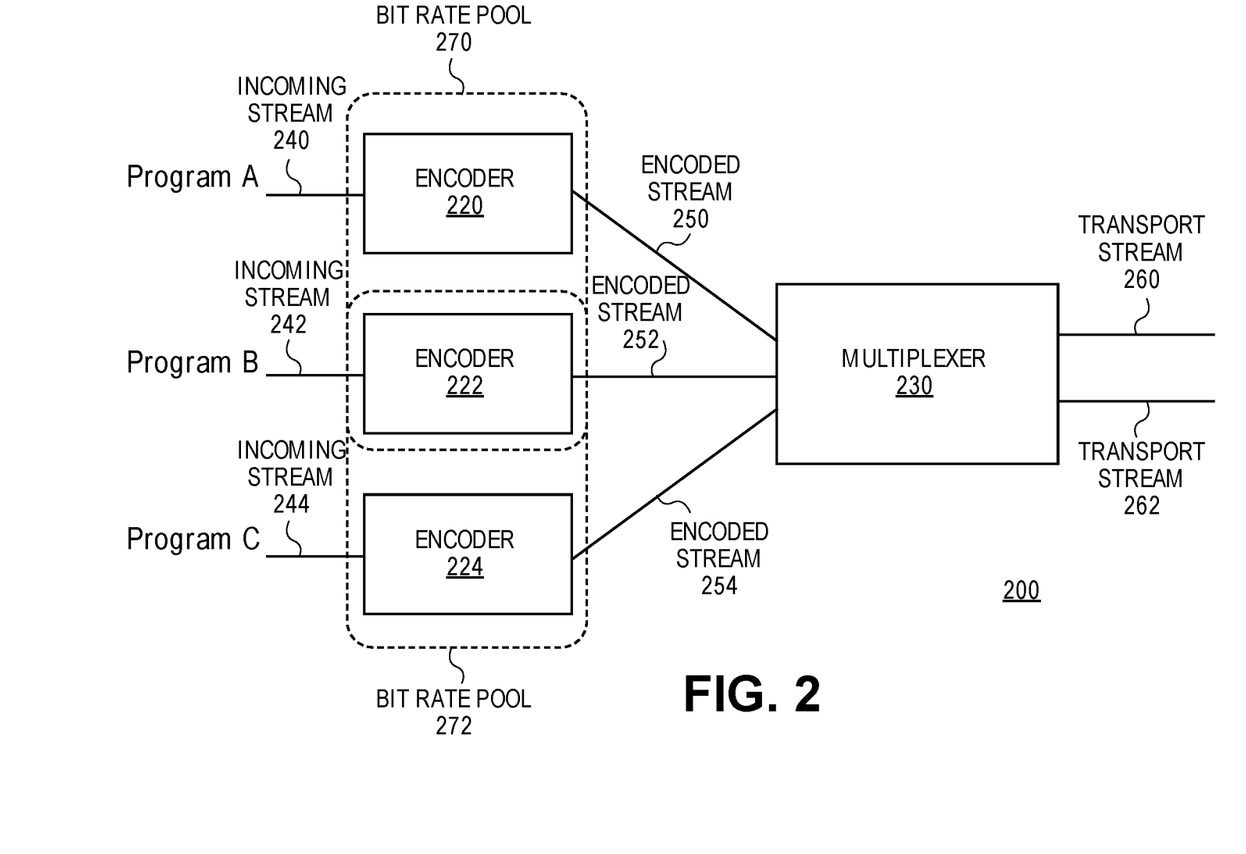
FIG. 2 is a block diagram of the functional components of a system according to one embodiment of the invention.

FIG. 2 is a block diagram of the functional components of system 200 according to an embodiment of the invention. Before discussing the components of system 200 in further detail, it is worth noting that prior to embodiments of the invention, an encoder could only belong to a single bit pool. For example, notice that encoder 122 belongs to bit pool 170 and encoder 124 belong to bit pool 172, even though encoders 122 and 124 are both encoding program B in the example described above in reference to FIG. 1. On the other hand, in the exemplary embodiment depicted in FIG. 2, note that encoder 222 is depicted as a member of both bit pools 270 and 272.

System 200 includes encoders 220, 222, and 224, which as broadly used herein, individually refer to hardware or software components responsible for converting an incoming digital video stream (expressed in a first digital video format) to an encoded digital video stream (expressed in a second and different digital video format).

For example, encoders 220, 222, and 224 may respectively convert incoming digital video streams 240, 242, and 244 from a first digital video format to encoded streams 250, 252, and 254, each of which is expressed in digital video format different from which incoming streams 240, 242, and 244 are expressed. While FIG. 2 depicts three encoders, embodiments of the invention may comprise any number of encoders.

Each of incoming digital video streams 240, 242, and 244 may comprise one or more programs. A used herein, a program refers to any unit of digital video, such as a movie, a show, or a commercial. However, note that an encoder may only encode a single program at a time. Thus, if a digital video stream carries more than one program, then an encoder may only encode one of those carried programs.

Multiplexer 230, as broadly used herein, refers to a software component for combining multiple encoded streams, such as encoded streams 250, 252, and 254, into a single transport stream, such as transport stream 260 or transport stream 262. The outputs of multiplexer 230 (such as transport streams 260 and 262) each have a constant total bit rate, while the inputs to multiplexer 230 (namely encoded streams 250, 252, and 254) have a variable bit rate. Note that multiplexer 230 is also responsible for certain behavior discussed below with respect to FIG. 3.

Figure 3:
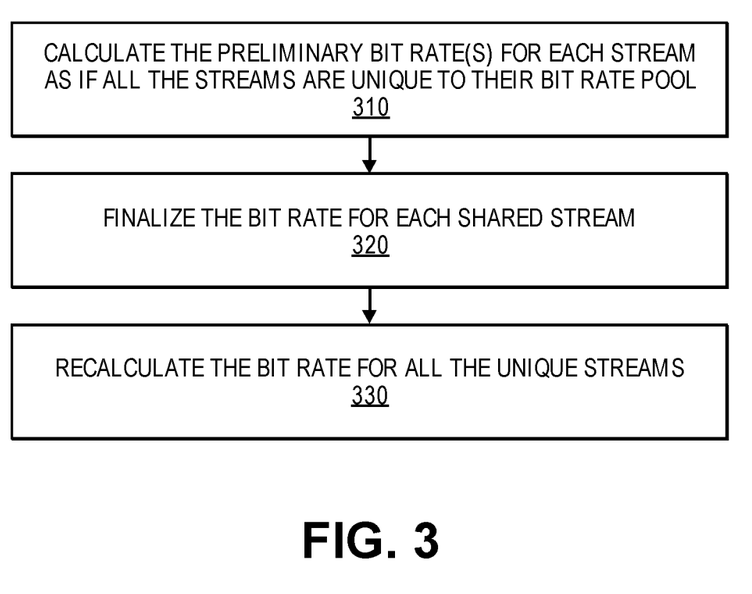
FIG. 3 is a flowchart illustrating the steps of allocating bit rates to units of digital video appearing in multiple digital video streams according to an embodiment of the invention.

FIG. 3 is a flowchart illustrating the steps of allocating bit rates to units of digital video appearing in multiple digital video streams according to an embodiment of the invention. The steps of FIG. 3 shall be described below in reference to the exemplary embodiment depicted by FIG. 2.

Initially, in step 310, a preliminary bit rate at which each encoder in system 200 should use to encode incoming digital video streams is calculated by multiplexer 230. Multiplexer 230 determines the preliminary bit rate of step 310 for each stream as if each stream is unique to their bit rate pool in system 200.

Separate preliminary bit rates are assigned in step 310 for each bit rate pool. For example, after receiving information from encoders 220, 222, and 224 that indicates the complexity of the program which each encoder is currently processing, multiplexer 230 performs step 310 by (a) assigning each of encoder 220 and 222 a preliminary bit rate at which each of encoder 220 and 222 should encode program A and program B in observance of the bit rate constraints imposed by bit rate pool 270 and (b) assigning each of encoder 222 and 224 a preliminary bit rate at which each of encoder 222 and 224 should encode program B and program C in observance of the bit rate constraints imposed by bit rate pool 272. The preliminary bit rate determined in step 310 is a provisional determination and is not necessarily the bit rate which will actually be used by any particular encoder of system 200.

In step 320, the bit rate to be used in encoding each shared stream is finalized. Initially, a determination is made by multiplexer 230 as to which programs by incoming digital video streams 240, 242, and 244 are shared or non-shared. When a program is a member of two or more bit rate pools, then that program shall be referred to herein as a shared program. On the other hand, if a program is a member of only a single bit rate pool, then the program shall be referred to as a non-shared program. For example, program A and program C are non-shared programs in this example because each is a member of a single bit rate pool, e.g., program A is a member of only bit rate pool 270 and program C is a member of only bit rate pool 272. On the other hand, program B is a shared program because program B is a member of bit rate pools 270 and 272. Embodiments ascertain the bit rate to use in encoding shared programs differently than non-shared programs. A streamed shared program shall be referred to herein as a shared stream, while a streamed non-shared program will be referred to herein as a non-shared stream or a unique stream.

After multiplexer 230 determines which programs carried by incoming streams 250, 252, and 254 are shared programs and which are non-shared programs, the bit rate to be assigned to each shared program is determined. The determination of step 320 is performed by multiplexer 230 in a manner which does not violate any constraints imposed by any bit rate pools.

Recall that each preliminary bit rate determined in step 310 is made for each stream as if each stream is unique to their bit rate pool in system 200. Thus, it follows that a shared program receives multiple preliminary bit rate allocations in step 310. For example, assume that incoming stream 240 and 244 carry a non-shared program while incoming stream 242 carries a shared program. In this example, the shared program carried by incoming stream 242 received two different preliminary bit rate assignments in step 310, as one preliminary bit rate was assigned for bit rate pool 270 and another was assigned for bit rate pool 272. In an embodiment, system 200, in performing step 320, will select as the final bit rate assignment of a shared program the smallest preliminary bit rate assignment rendered in step 310 for the shared program.

By selecting the smallest preliminary bit rate assignment for a particular shared program, there is no disruption to any of the other non-shared programs which are in the same bit rate pool. There is no disruption because any discrepancy would be the result of using fewer bits on the shared program than provisionally assigned; consequently, the only impact would be an increase in the number of bits which may be allocated to non-shared programs which are members of the same bit rate pool. Further, selecting the smallest preliminary bit rate assignment for a particular shared program does not harm or negatively impact the video quality of the shared program in any meaningful way because the smallest preliminary bit rate assignment is still the product of an algorithm or process that is designed to yield encoded digital video at a desired or target video quality level.

In step 330, the bit rate for all unique streams is recalculated. To do so, in an embodiment, the remaining unassigned portion of each bit rate pool is allocated to the non-shared programs for each bit rate pools. In other words, the preliminary bit rate determined for the non-shared programs determined in step 310 is not used; instead, the unassigned portion of every bit rate pool remaining after the shared programs have had their bit rates assigned is allocated to the non-shared programs. In step 330, multiplexer 230 may determine the bit rate to be used in encoding each non-shared program; afterward, multiplexer 230 may communicate the bit rate assigned to each non-shared program to the responsible encoder in system 200 so that the encoder(s) in system 200 can encode the non-shared programs at their assigned bit rate.

Advantageously, embodiments of the invention allow individual streams to share multiple bit rate pools while maintaining the variable bit rate of the stream and actively participating in the stat-mux algorithm of all the bit rate pools. Additionally, embodiments enable the capping of bite rates on any subset of pool members by the creation of another bit rate pool for them. Previously, bit rate capping was only possible for the entire pool or for individual pool members.

In an embodiment, a single encoder in system 200 may be responsible for encoding a shared program regardless of how may transport streams in system 200 is carrying the unit of digital video. Embodiments of the invention have certain applicability in addresses national versus regional content, as national programs tend to be carried by more than one stream while regional programs tend to be carried by only one stream. In certain contexts where some digital video streams correspond to national television channels, while other digital video streams correspond to regional television channels, it is possible that multiple digital video streams may comprise that same unit of digital video (i.e., the same program or commercial).

In an embodiment, each of encoders 220, 222, and 224 as well as multiplexer 230 of FIG. 2 may be implemented on a computer system. Non-limiting, illustrative examples of at least one encoder or multiplexer executing on a computer system include the Electra family of products, the ProStream family of products, and the VIBE family of products, each of which is offered by Harmonic, Inc. of San Jose, Calif.

Figure 4:
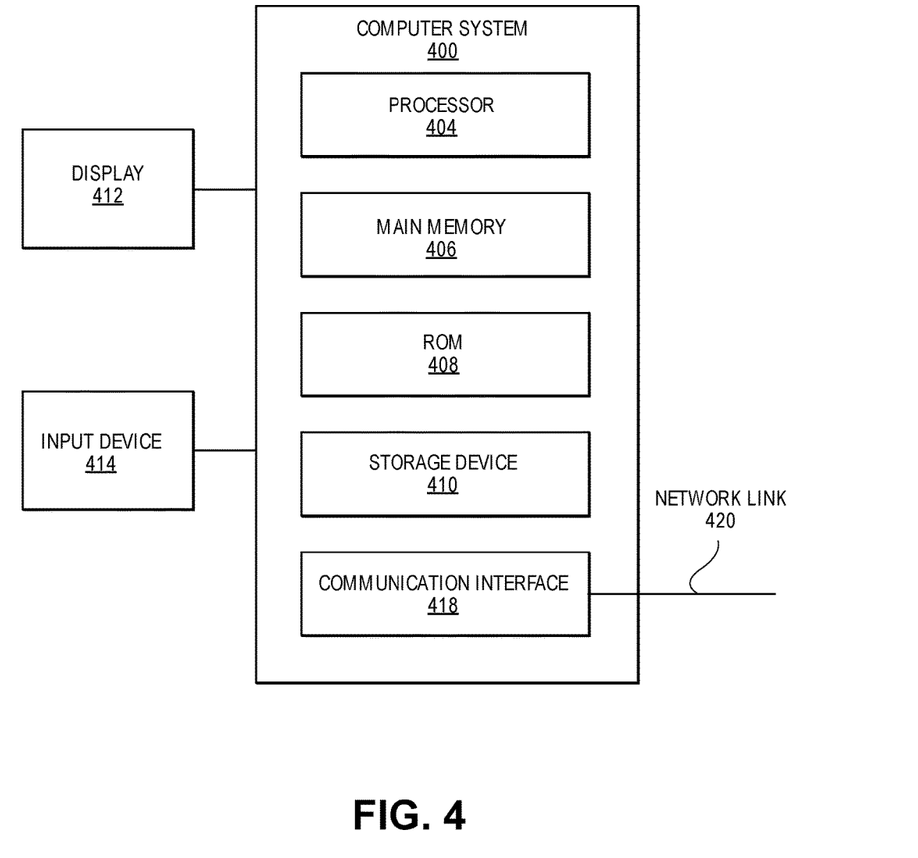
FIG. 4 is a block diagram that illustrates a computer system upon which an embodiment of the invention may be implemented.

Components of FIG. 2 may be implemented on the same computer system, as two or more components of FIG. 2 may, but need not, be implemented on the same computer system. FIG. 4 is a block diagram that illustrates a computer system 400 upon which an embodiment of the invention may be implemented. Note that the computer system 400 depicted in FIG. 4 is meant to represent the general components of a computer system, but in practice the hardware upon which an encoder or multiplexer of an embodiment may differ, e.g., the computer system have different input or output mechanisms than those depicted in FIG. 4.

In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be, but need not be, coupled to a display 412, such as a cathode ray tube (CRT), a LCD monitor, and a television set, for displaying information to a user. An input device 414, including alphanumeric and other keys, may be, but need not be, coupled to computer system 400 for communicating information and command selections to processor 404. Other non-limiting, illustrative examples of optional input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any non-transitory medium that participates in storing instructions which may be provided to processor 404 for execution. Such a medium may take many forms, including optical or magnetic disks, such as storage device 410. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other persistent medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for allocating bit rates to multiple digital video streams, which when executed by one or more processors, causes:
    multiplexing a plurality of digital video streams into a single communication channel, wherein multiplexing comprises:
        allocating bit rates to a plurality of digital video streams by permitting any unit of digital video carried by said plurality of digital video streams to be a member of two or more bit rate pools, wherein each of said two or more bit rate pools is a set of digital content that is constrained by a sum of bit rates assigned to members of the set.

2. The non-transitory computer-readable storage medium of claim 1, wherein allocating bit rates to the plurality of digital video streams comprises:
    determining a first set of bit rates to assign to each of said plurality of digital video streams;
    after determining said first set of bit rates to assign to each of said plurality of digital video streams, determining a second set of bit rates to assign to each shared unit of digital video within said plurality of digital video streams, wherein each said shared unit of digital video appears in two or more of said plurality of digital video streams; and
    after determining the second set of bit rates to assign to each shared unit of digital video within said plurality of digital video streams, allocating a remaining bit rate allotment to non-shared units of digital video within said plurality of digital video streams, wherein said non-shared units of digital video appear in only one of said two or more plurality of digital video streams.

3. The non-transitory computer-readable storage medium of claim 2, wherein determining said second set of bit rates to assign to each shared program within said plurality of digital video streams comprises:
    identifying a lowest bit rate assigned to each shared unit of digital video across said two or more bit rate pools; and
    allocating, to each shared unit of digital video, said lowest bit rate for that shared unit of digital video for use in encoding each occurrence of the shared unit of digital video in said plurality of digital video streams.

4. The non-transitory computer-readable storage medium of claim 2, wherein each shared unit of digital video is encoded a single time by a single encoder.

5. The non-transitory computer-readable storage medium of claim 2, wherein said shared unit of digital video corresponds to a national program, and wherein said non-shared unit of digital video corresponds to a regional program.

6. An apparatus for allocating bit rates to multiple digital video streams, which when executed by one or more processors, comprising:
    one or more processors; and
    one or more non-transitory computer-readable storage mediums storing one or more sequences of instructions, which when executed, cause:
        multiplexing a plurality of digital video streams into a single communication channel, wherein multiplexing comprises:
            allocating bit rates to a plurality of digital video streams by permitting any unit of digital video carried by said plurality of digital video streams to be a member of two or more bit rate pools, wherein each of said two or more bit rate pools is a set of digital content that is constrained by a sum of bit rates assigned to members of the set.

7. The apparatus of claim 6, wherein allocating bit rates to the plurality of digital video streams comprises:
    determining a first set of bit rates to assign to each of said plurality of digital video streams;
    after determining said first set of bit rates to assign to each of said plurality of digital video streams, determining a second set of bit rates to assign to each shared unit of digital video within said plurality of digital video streams, wherein each said shared unit of digital video appears in two or more of said plurality of digital video streams; and
    after determining the second set of bit rates to assign to each shared unit of digital video within said plurality of digital video streams, allocating a remaining bit rate allotment to non-shared units of digital video within said plurality of digital video streams, wherein said non-shared units of digital video appear in only one of said two or more plurality of digital video streams.

8. The apparatus of claim 7, wherein determining said second set of bit rates to assign to each shared program within said plurality of digital video streams comprises:
    identifying a lowest bit rate assigned to each shared unit of digital video across said two or more bit rate pools; and
    allocating, to each shared unit of digital video, said lowest bit rate for that shared unit of digital video for use in encoding each occurrence of the shared unit of digital video in said plurality of digital video streams.

9. The apparatus of claim 7, wherein each shared unit of digital video is encoded a single time by a single encoder.

10. The apparatus of claim 7, wherein said shared unit of digital video corresponds to a national program, and wherein said non-shared unit of digital video corresponds to a regional program.

11. A method for allocating bit rates to multiple digital video streams, comprising:

multiplexing a plurality of digital video streams into a single communication channel, wherein multiplexing comprises:
   allocating bit rates to a plurality of digital video streams by permitting any unit of digital video carried by said plurality of digital video streams to be a member of two or more bit rate pools, wherein each of said two or more bit rate pools is a set of digital content that is constrained by a sum of bit rates assigned to members of the set.

12. The method of claim 11, wherein allocating bit rates to the plurality of digital video streams comprises:
   determining a first set of bit rates to assign to each of said plurality of digital video streams;
   after determining said first set of bit rates to assign to each of said plurality of digital video streams, determining a second set of bit rates to assign to each shared unit of digital video within said plurality of digital video streams, wherein each said shared unit of digital video appears in two or more of said plurality of digital video streams; and
   after determining the second set of bit rates to assign to each shared unit of digital video within said plurality of digital video streams, allocating a remaining bit rate allotment to non-shared units of digital video within said plurality of digital video streams, wherein said non-shared units of digital video appear in only one of said two or more plurality of digital video streams.

13. The method of claim 12, wherein determining said second set of bit rates to assign to each shared program within said plurality of digital video streams comprises:
   identifying a lowest bit rate assigned to each shared unit of digital video across said two or more bit rate pools; and
   allocating, to each shared unit of digital video, said lowest bit rate for that shared unit of digital video for use in encoding each occurrence of the shared unit of digital video in said plurality of digital video streams.

14. The method of claim 12, wherein each shared unit of digital video is encoded a single time by a single encoder.

15. The method of claim 12, wherein said shared unit of digital video corresponds to a national program, and wherein said non-shared unit of digital video corresponds to a regional program.

* * * * *